(12) United States Patent
Ki et al.

(10) Patent No.: US 9,239,786 B2
(45) Date of Patent: Jan. 19, 2016

(54) RECONFIGURABLE STORAGE DEVICE

(71) Applicant: Samsung Electronics, Ltd., Gyeonggi-do (KR)

(72) Inventors: Yang Seok Ki, Gyeonggi-do (KR); Seongnam Kwon, Gyeonngi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 209 days.

(21) Appl. No.: 13/936,992

(22) Filed: Jul. 8, 2013

(65) Prior Publication Data

US 2013/0297907 A1 Nov. 7, 2013

Related U.S. Application Data

(63) Continuation-in-part of application No. 13/733,309, filed on Jan. 3, 2013.

(30) Foreign Application Priority Data

Jan. 18, 2012 (KR) .......................... 10-2012-0005764

(51) Int. Cl.
*G06F 12/06* (2006.01)
*G06F 11/34* (2006.01)
*G06F 3/06* (2006.01)

(52) U.S. Cl.
CPC .......... *G06F 12/0684* (2013.01); *G06F 3/0605* (2013.01); *G06F 3/0632* (2013.01); *G06F 3/0679* (2013.01); *G06F 3/0629* (2013.01); *G06F 11/3409* (2013.01); *G06F 11/3447* (2013.01); *G06F 11/3485* (2013.01)

(58) Field of Classification Search
CPC ............ G06F 11/3409; G06F 11/3447; G06F 11/3485; G06F 3/0629
See application file for complete search history.

(56) References Cited

U.S. PATENT DOCUMENTS 6,487,562 B1 * 11/2002 Mason et al.
7,133,907 B2 11/2006 Carlson
(Continued)

FOREIGN PATENT DOCUMENTS

CN 102073596 7/2012

OTHER PUBLICATIONS

U.S. Appl. No. 13/733,309, filed Jan. 3, 2013, entitled, "Memory System Using a Storage Having Firmware With a Plurality of Features".

(Continued)

*Primary Examiner* — Ryan Bertram
(74) *Attorney, Agent, or Firm* — Convergent Law Group LLP (57) ABSTRACT

Exemplary embodiments for reconfiguring a storage system comprise receiving user requirement information for a storage device and automatically generating feature settings for the storage device from the user requirement information and a device profile for the storage device; and using the feature settings to automatically reconfigure the storage device into one or more logical devices having independent behavioral characteristics. Further exemplary embodiments comprise receiving feedback from the storage device regarding runtime performance data of at least one of the storage device and the logical devices; and responsive to a determination that the runtime performance data do not satisfy the user requirement information, dynamically adjusting configuration of the one or more logical devices to meet the user requirement information.

38 Claims, 7 Drawing Sheets

(56) References Cited

U.S. PATENT DOCUMENTS

| | | |
|---|---|---|
| 7,236,987 B1 | 6/2007 | Faulkner |
| 7,415,506 B2 | 8/2008 | Gajjar |
| 7,424,687 B2 | 9/2008 | Andreev |
| 7,568,037 B2 | 7/2009 | Laurent et al. |
| 7,577,729 B1 | 8/2009 | Umbehocker |
| 7,890,710 B2 | 2/2011 | Lyle |
| 7,941,632 B2 | 5/2011 | Karpoff |
| 8,042,082 B2 | 10/2011 | Solomon |
| 8,112,582 B2 | 2/2012 | Porel et al. |
| 8,756,307 B1 * | 6/2014 | Chen et al. .................... 709/224 |
| 2003/0135609 A1 | 7/2003 | Carlson |
| 2006/0161753 A1 | 7/2006 | Aschoff |
| 2007/0028053 A1 | 2/2007 | Shet |
| 2007/0112868 A1 | 5/2007 | Kolovson |
| 2008/0320254 A1 | 12/2008 | Wingard |
| 2009/0106541 A1 | 4/2009 | Mizuno et al. |
| 2010/0287408 A1 * | 11/2010 | Kopylovitz ....................... 714/6 |
| 2010/0325374 A1 | 12/2010 | Cypher |
| 2011/0199805 A1 | 8/2011 | Solomon |
| 2012/0079306 A1 | 3/2012 | Jayakumar |
| 2012/0191967 A1 | 7/2012 | Lin et al. |
| 2013/0060993 A1 | 3/2013 | Park et al. |

OTHER PUBLICATIONS

Figures as filed in U.S. Appl. No. 13/733,309, filed Jan. 3, 2013, entitled, "Memory System Using a Storage Having Firmware With a Plurality of Features".

Hsiao et al., "A Reconfigurable Virtual Storage Device", 2009 IEEE International Symposium on Object/Component/Service-Oriented Real-Time Distributed Computing.

* cited by examiner

RECONFIGURABLE STORAGE DEVICE

CROSS-REFERENCE TO RELATED APPLICATIONS

This application is a Continuation-In-Part of patent application Ser. No. 13/733,309, entitled "Memory System Using A Storage Having Firmware With a Plurality Of Features" filed on Jan. 3, 2013, which claims priority under 35 U.S.C. §119 from Korean Patent Application No. 10-2012-0005764 filed on Jan. 18, 2012 in the Korean Intellectual Property Office, and all the benefits accruing therefrom under 35 U.S.C. 119, the contents of both applications are herein incorporated by reference.

BACKGROUND

Modern storage systems typically include multiple standalone storage devices that are passive and whose performance characteristics are fixed in general once manufacturing is complete. A processor (e.g., RAID controller) executing software (firmware) is necessary to add intelligence to make the collection of unintelligent storage devices work as a unit. Because storage devices, such as solid state drives (SSDs), may be also controlled through the software or firmware, efforts have been made to control operating characteristics of a solid state drive according to the use environment.

The traditional approaches for satisfying user qualification tests require a manufacturer to provide last minute engineering processes to customize the storage devices for each customer. Customers typically wish to recalibrate their software systems whenever new models of storage devices are adopted because the characteristics of the storage devices are widely heterogeneous. However, the assumptions for one storage device are often not valid with another device. Consequently, traditional customization approaches are not sustainable in part because the manufacturer's engineering cost increases with the number of storage devices and customers requiring customization.

Therefore, a framework that enables an easy reconfiguration of storage systems on the behalf of customers is crucial. For instance, solid state disk (SSD) optimization software, such as Magician™ by Samsung, tunes performance of SSDs for a customer's system. However, customers have very limited optimization options, the optimization metrics are device-oriented in contrast to user-oriented, and the optimization is not controlled or quantifiable. In addition, storage device characteristics can change over time due to the degradation of the storage media such as wearing and fatigue. This can violate the initial assumption that the customer had, which cannot be perceived easily until malfunctions happen at the user level.

Another type of reconfigurable storage device process allows a customer to select individual features to configure a storage device. In this approach, instead of adjusting a customer's system to a new storage device, a reconfigurable storage device allows the customer to adjust the storage devices to their systems, which simplifies the maintenance and upgrade process.

Although reconfigurable storage devices can provide more flexibility in performance optimization and allow the customers to do customization, several challenges remain. One challenge is that the recalibration process constitutes a combinatory problem whose complexity increases exponentially with the number of features of the storage device to customize. In other words, current approaches do not provide systematic configuration method for feature selection. For example, if a customer changes the value of three features, it may be difficult for the customer to determine what effect the combination of features will be on the performance of the storage device.

A related challenge is that the selection of features by the customer is accomplished through a software user interface in which the customer selects the features manually. Manual selection of features without a systematic configuration method or performance guideline results is essentially a trial and error process.

Finally, the conventional reconfiguration process does not address the effects of storage device characteristics changing over time due to the degradation of the storage media. Such changes can render the original selection of features for a particular use environment no longer valid.

Accordingly, the trend of software-defined storage (SDS) in which storage resources required by an application can be defined by software and provisioned automatically requires an improved reconfigurable storage process that is more flexible.

BRIEF SUMMARY

The exemplary embodiment provides methods and systems for reconfiguring storage devices. Aspects of exemplary environment include receiving user requirement information for a storage device and automatically generating feature settings for the storage device from the user requirement information and a device profile for the storage device; and using the feature settings to automatically reconfigure the storage device into one or more logical devices having independent behavioral characteristics. Further exemplary embodiments comprise receiving feedback from the storage device regarding runtime performance data of at least one of the storage device and the logical devices; and responsive to a determination that the runtime performance data do not satisfy the user requirement information, dynamically adjusting configuration of the one or more logical devices to meet the user requirement information.

According to the method and system disclosed herein, the exemplary embodiments provide a reconfiguration process that eliminates the need to modify configuration software on a host in order to configure different storage devices per user requirements. The exemplary embodiments are in contrast to conventional methods in which the configuration software on the host would need to be modified in order to customize different storage devices. In addition, because the exemplary embodiments automatically translate the user requirements into feature settings, the need for the user to manually select combinations of feature when configuring the storage device is eliminated.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "component" or "module", as used herein, means, but is not limited to, a software or hardware component, such as a field programmable gate array (FPGA) or an application specific integrated circuit (ASIC), which performs certain tasks. A component or module may advantageously be configured to reside in the addressable storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Figure 1:
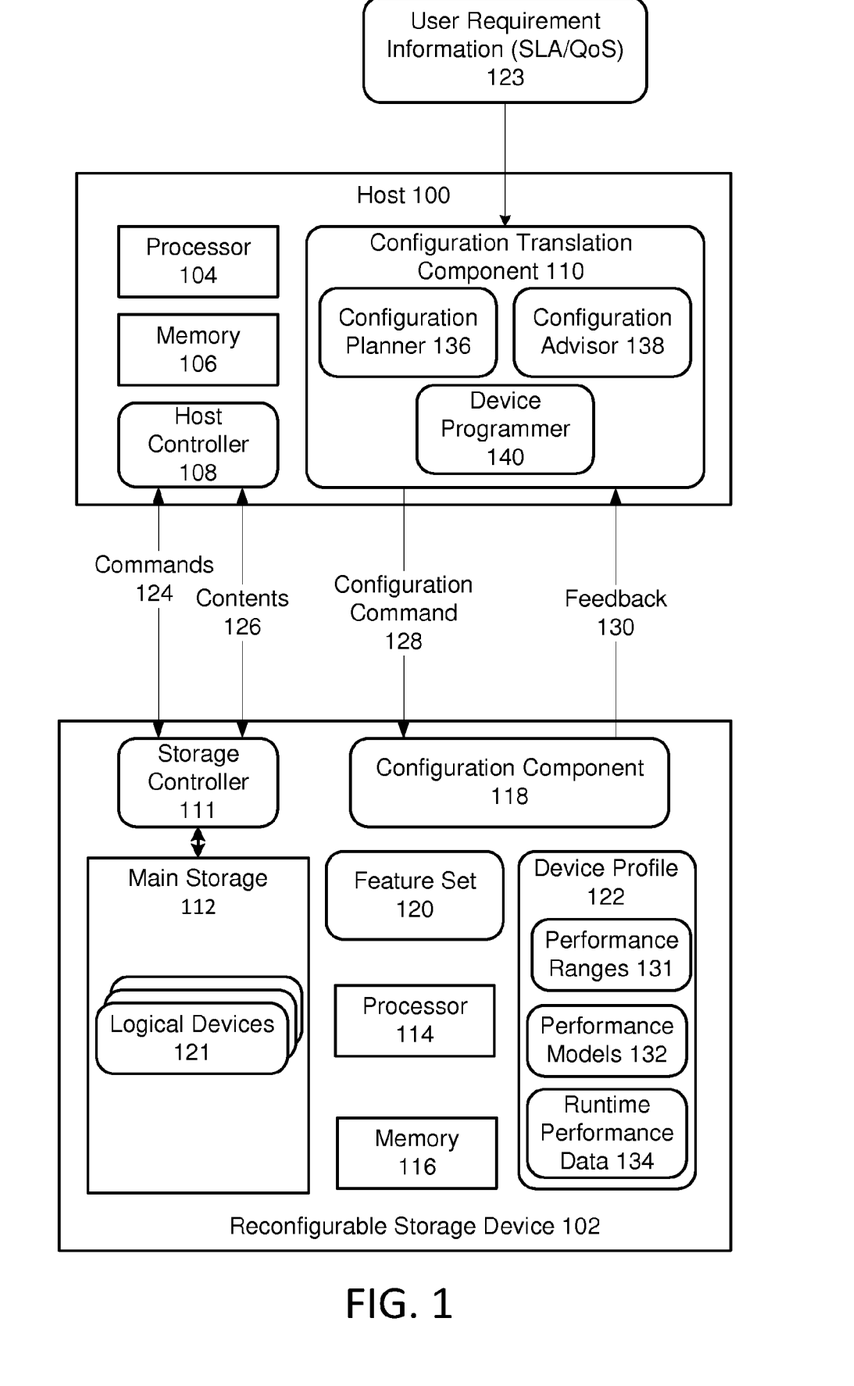
FIG. 1 is a block diagram illustrating an exemplary embodiment of a reconfigurable storage system.

FIG. 1 is a block diagram illustrating an exemplary embodiment of a reconfigurable storage system. The system includes a host 100 coupled to a reconfigurable storage device 102. In one embodiment, basic components of the host 100 may include at least one processor 104, memory 106, and a host controller 108. In one embodiment, basic components of the reconfigurable storage device 102 may include a storage controller 111, a main storage 112, at least one processor 114, and a memory 116.

The main storage 112 implements native storage functionalities and provides the storage space for the reconfigurable device 102. The main storage 112 may include, but is not limited thereto, a non-volatile memory such as Flash (e.g., implemented as solid state drive (SSD)), PCRAM, RRAM, STT-RAM, and the like, and storage management firmware (not shown) such as FTL (Flash Translation Layer), GC (Garbage Collector), and the like. One or more logical devices 121 may account for a portion of the main storage 112. The actual physical storage space allocated for the logical devices 121 is dependent on the space efficiency requirements. A logical device with thin-provisioning can occupy less physical storage space than a logical device with thick-provisioning.

During normal operation, the host controller 108 may output commands 124 associated with a content read/write operation to a storage controller 111 to allow the host 100 to process contents stored in main storage 112 or store new contents in the main storage 112. Here, processing the contents in the host 100 may include displaying or printing the contents in the form of image and document, playing back the contents in the form of audio and/or video, and installing or executing the contents in the form of application such as computer program on a functional unit such as the processor 104.

The storage controller 111 receives the command associated with the contents from the host controller 108 and controls contents 126 stored in the main storage 112 according to the received command. For example, when the received command is a read command, the storage controller 111 may provide the contents 126 stored in the main storage 112 to the host 100, and when the received command is a write command, the storage controller 111 may receive new contents 126 from the host 100 and store the received contents in the main storage 112.

Further, although the host controller 108 and storage controller 111 are shown as separate components, in an alternative embodiment, the host controller 108 and the storage controller 111 may be implemented as one integrated unit if necessary.

As stated above, one problem with the conventional storage devices is that they are fixed devices with little built-in intelligence. Consequently, the process of customizing the storage device for customer request may be costly and time-consuming.

According to the exemplary embodiment, the host 100 is further provided with a configuration translation component 110, while the reconfigurable storage device 102 is provided with a configuration component 118, a feature set 120 and a device profile 122. In one embodiment, the configuration translation component 110 on the host 100 may be configured to receive and convert user requirements 123 describing behavioral characteristics for the reconfigurable storage device 102 into a configuration command 128 defining features settings for the behavioral characteristics for the reconfigurable storage device 102. In one embodiment, functions of the configuration translation component 110 may be performed by separate components, such as a configuration planner 136, a device programmer 136, and a configuration advisor 138.

Correspondingly, the configuration component 118 on the reconfigurable storage device 102 may be configured to receive the configuration command 128 and implement the feature settings corresponding to the configuration command 128, thereby automatically configuring behavioral characteristics of the reconfigurable storage device 102. Thereafter, the storage controller 110 may send/receive contents 126 to/from the host 100 while the main storage 112 is driven according to the set behavioral characteristics.

In a further aspect of the exemplary embodiment, during operation of the reconfigurable storage device 102, the configuration translation component 110 may receive feedback 130 from the reconfigurable storage device 102 regarding performance characteristics of the reconfigurable storage device 102 and may adjust the configuration command 128 (and consequently the feature set) accordingly based on feedback 130.

In one embodiment, the configuration translation component 110 and the configuration component 118 are implemented as software components. In another embodiment, the components could be implemented as a combination of hardware and software. Although the configuration translation component 110 and the configuration component 118 are shown as single components, the functionality of each may be combined into a lesser or a greater number of modules/components. For example, in one embodiment, the storage controller 111 and the host controller 108 may be both implemented on the host 100 as one integrated component or as separate components.

Also, although the user requirement information 123 is shown being input to the host 100, in an alternative embodiment, the reconfigurable storage device 102 could be adapted to receive the user requirement information 123 and provide the user requirement information 123 to the host 100.

The reconfigurable storage system of the exemplary embodiments may be applied to a broad range of storage markets from client to enterprise, which could be applied to a disk for a single standalone machine (such as desktop, laptop, workstation, server, and the like), storage array, software-define storage (SDS), application-specific storage, virtual machine (VM), virtual desktop infrastructure (VDI), content distribution network (CDN), and the like.

In one embodiment, for example, reconfigurable storage device 102 may be integrated in one semiconductor device to form a personal computer memory card international association (PCMCIA), a compact flash (CF), a smart media card (SM, SMC), a memory stick, a multimedia card (MMC, RS-MMC, MMC-micro), an SD card (SD, miniSD, microSD, SDHC), an universal flash storage (UFS) device, and the like.

In one embodiment, for example, the main storage part 112 may be formed of a plurality of non-volatile memory chips, i.e., a plurality of flash memories. As another example, the main storage part 112 may be formed of different-type non-volatile memory chips (e.g., PRAM, FRAM, MRAM, etc.) instead of flash memory chips. Alternatively, the main storage part 112 can be formed of volatile memories, i.e., DRAM or SRAM, and may have a hybrid type where two or more types of memories are mixed.

Figure 2A:
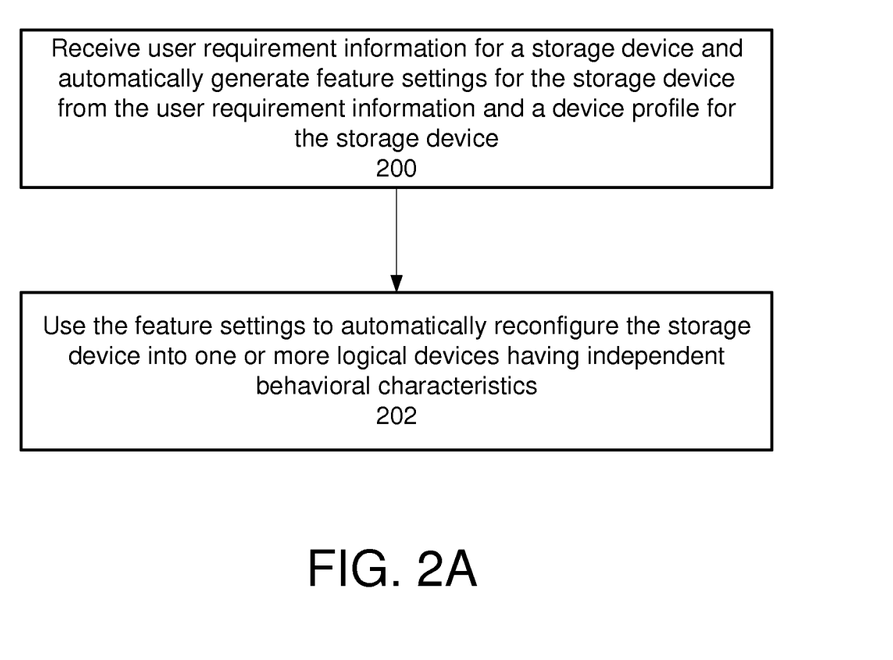
FIGS. 2A and 2B are a flow diagram illustrating one embodiment of a process for reconfiguring a storage system.
Figure 2B:
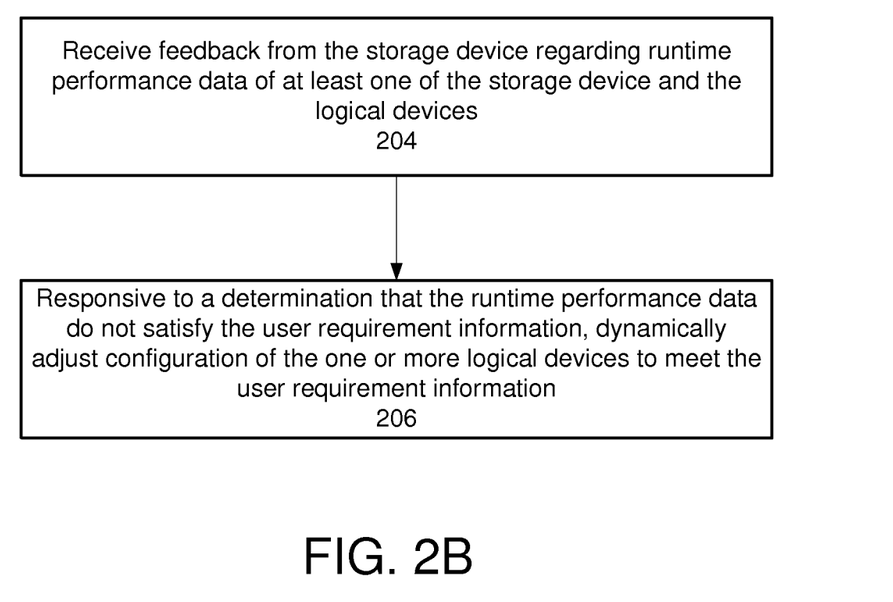

FIGS. 2A and 2B are flow diagrams illustrating one embodiment of a process for reconfiguring a storage system. FIG. 2A is a flow diagram illustrating a configuration process for reconfiguring the reconfigurable storage device per a user's requirements, while FIG. 2B is a flow diagram illustrating the process for configuring the reconfigurable storage device 102 during operation of the reconfigurable storage system.

Referring to FIG. 2A, the process may begin by the configuration translation component 110 receiving user requirement information 123 for a storage device and automatically generating feature settings for the storage device from the user requirement information and a device profile for the storage device (block 200). The configuration component 118 may then use the feature settings to automatically reconfigure the storage device into one or more logical devices 121 having independent behavioral characteristics (block 202).

Referring to FIG. 2B, a flow diagram illustrating the process for configuring the reconfigurable storage device 102 during operation of the reconfigurable storage system is shown. In this embodiment, the configuration translation component 110 receives feedback 130 from the storage device regarding runtime performance data 134 of at least one of the storage device and the logical devices (block 204). Responsive to a determination that the runtime performance data do not satisfy the user requirement information, the configuration translation component 110 dynamically adjusts configuration of the one or more logical devices to meet the user requirement information (block 206).

One advantage of the reconfigurable storage system is that storage management of the configuration translation component 110 (i.e., user software) over new reconfigurable devices can be simplified because the exemplary embodiments abstract peculiarities and reconfiguration complexity of storage devices. Another advantage is that the user software that uses new reconfigurable storage devices can virtually stay constant regardless of models of storage devices because the user software can define and create its own logical device from the reconfigurable storage devices per the user requirements dynamically.

Referring again to FIG. 1, according to another aspect of the exemplary embodiment, the user requirement information 123 may include a high-level description of the behavioral characteristics of the reconfigurable storage device 102, as opposed to actual values for different features. According to one embodiment, the high-level description may comprise a service level agreement (SLA) for the reconfigurable storage device 102. SLAs are commonly service contracts negotiated between two parties, such as a customer, and a manufacturer.

According to a further embodiment, the high-level description may further comprise quality of service (QoS) requirements, which in one embodiment, are part of the SLA. However, in another embodiment, the QoS may be separate from the SLA if the user is only interested in performance aspect. QoSs in the exemplary embodiments may comprise performance characteristics of storage device in terms of latency, IOPS, bandwidth, jitter, WAF/RAF which are to define the user's detailed performance expectation. For instance, after a virtual device is created, it may be desirable to adjust the QoS only instead of creating a new logical device. Automatically configuring the reconfigurable storage device 102 using the SLA and QoS as disclosed herein results in the configuration being accomplished in a quantitative manner.

In one embodiment, an SLA may comprise specifications for any combination of attributes expressed in an XML format. An attribute can be performance characteristics (QoS) of storage device such as latency, and IOPS, or non-performance characteristics such as capacity, addressing mode, and protection. Commitment is the average percentage of QoS satisfaction ratio of operations. Reaction is what the host expects in case of QoS violation. The capacity specification may specify an amount of data space and space savings. Capacity may indicate an amount of data in the user space, not the actual storage space allocated in the device. In this sense, the capacity specification is independent of the mechanism the device actually uses to implement this, but all that is needed is a guarantee that the amount of data can be stored at the user level. For instance, a device that adopts a thick provisioning technique allocates the actual space when a request is granted, while a device that adopts a thin provisioning technique may not allocate the space up-front. Likewise, the actual physical space that a device with a space saving feature such as over-commitment, compression, deduplication allocates can be much smaller than the data space that the user requests.

The addressing mode specification may specify the manner in which data is to be addressed in storage: byte-addressable, word-addressable, and/or block-addressable. For instance, a peripheral component interconnect express (PCIe) device is byte-addressable as well as block-addressable. Likewise, a single address space operating system can emulate byte addressing over block-addressable devices. The QoS should be interpreted in the context of a specific addressing mode.

The protection specification may specify security and access control. A device can support encryption and the user can use a specific encryption algorithm (e.g., 128 bit RSA, 256 AES) per its security requirements. The user may also need a secure erasure of data with the user's risk of unrecoverable when the data is deleted. In addition, the user can define access controls like read-only, writable, write-once at the device level. For instance, a recovery image of the system can be stored in a write-once logical device.

The performance specification may specify latency, throughput, bandwidth, and/or input/output operations per second (IOPS) measurements so the user can have detailed performance requirements for a device. For instance, the storage devices used for storing video clips in a video-on-demand server need high sequential read performance. In contrast, a storage device used for managing metadata may require high IOPS (and low latency).

Example SLAs may include the following.
Example 1)

```
<sla>
    <device_name>vol1</device_name>
    <device_type>logical</device_type>
    <capacity>100GB</capacity>
    <space_management>thick</space_management>
    <address_mode>byte</address_mode>
    <qos>
        <latency>
            <operation>read | write </operation>
            <unit>4KB</unit>
            <max>10ms</max>
        </latency>
        <commit>
            <window>1h</window>
            <threshold>99.9%</threshold>
        </commit>
        <react>notification</react>
    </qos>
    <qos>
        <iops>
            <ratio>50:50</ratio>
            <unit>4KB</unit>
            <min>1K</min>
        </iops>
        <commit>
            <window>1h</window>
            <threshold>99.9%</threshold>
        </commit>
        <react>notification</react>
    </qos>
</sla>
```

In the above example, the user may be interested in 100 GB device which is byte-addressable. In addition, the 4 KB page read latency must be smaller than 10 ms and the 4 KB write latency must be smaller than 10 ms as well. Finally, the IOPS of device must be at least 1K.

Example 2)

```
<sla>
    <device_name>vol2</device_name>
    <device_type>logical</device_type>
    <capacity>200GB</capacity>
    <protection>secure_erase</protection>
    <qos>
        <latency>
            <operation> write </operation>
            <unit>4KB</unit>
            <max>50ms</max>
        </latency>
    </qos>
</sla>
```

Example 3)

```
<qos>
    <device_name>vol1</device_name>
    <latency>
        <operation>read</operation>
        <average>1ms</average>
        <error>5%</error>
    </latency>
</qos>
```

The reconfigurable storage device 102 may further include a plurality of operational features, referred to here as a feature set 120. In one embodiment, the feature set 120 may include hardware operation (e.g., clock frequency, over-provisioning ratio), command scheduling policy (e.g., read over write, random access over sequential access, small request over big request, scheduling algorithm, read over GC), logical device characteristics (e.g., capacity, queue length, timeout control, protection), mapping policy of logical address onto physical address (e.g., page mapping, block mapping, hybrid mapping), background job execution policy (e.g., garbage collection algorithm, period and frequency of garbage collection, background TRIM, background compaction), and so on, which are not exhaustive.

Once the configuration translation component 110 receives the user requirement information 123, the configuration translation component 110 may automatically translate the user requirement information 123 into feature settings that may be used to enable/disable particular features in the feature set 120, as well as specify values for particular features. The effect of a feature can be global to all logical devices 121 or local to a specific logical device. For instance, the adjustment of operating frequency of device is global, which changes the behavior of all logical devices 121 while the increase of queue length of a logical device is local to the device only.

According to one aspect of the exemplary embodiment, the configuration translation component 110 generates the feature settings based on both the user requirement information 123 and the device profile 122. In one embodiment, the device profile 122 may include performance ranges 131 of features (e.g., range of adjustable clock frequency) particular to the storage device, performance models 132, and runtime performance data 134. The runtime performance data 134 may comprise runtime performance statistics measured by the device during operation.

According to one exemplary embodiment, the performance models 132 may be created and associated with features of the reconfigurable storage device 102 that have correlation with device performance. In one embodiment, the performance models 132 may comprise mathematical models (e.g., linear, polynomial, log, exponential, or step function) for individual features and/or combinations of feature settings, and/or ideal performance data measured in a controlled environment to estimate QoS.

Table 1 below shows an example feature set 120 and associated performance models. The models in this invention are exemplary and are dependent on vendors and devices.

TABLE 1

| Feature | Effect | Performance Model |
|---|---|---|
| Clock Frequency | IOPS | Model W (e.g., Linear) |
| Queue Size | IOPS | Model X (e.g., Log) |
| Thermal | IOPS/Latency | Model Y (e.g., Inverse polynomial) |
| Over-provisioning | Latency | Model Z (e.g., Log) |
| Timeout | N/A | Constant |

In one embodiment, any feature that can change the performance characteristics of device may have an associated performance model 132 and/or an ideal performance reference tables if a model is not feasible. In one embodiment, either the configuration translation component 110 or the configuration component 118 may use the device profile 122 and/or the performance models 132 to determine whether a specification of the user requirement information 123 can be satisfied by the reconfigurable storage device 102. For instance, a user can improve the response time of read operation by increasing the clock rate of physical device. However, a device has a limited range of clock rates that can be adjusted. If the device already reaches to its maximum clock rate, the clock adjustment feature cannot be used to improve the latency time. Similarly, if IOPS to clock rate can be modeled as a linear function to a certain extent, for example, it can be determined how much the clock rate is to be increased.

In one embodiment, the device profile 122, including the performance models 132, may be made available to the configuration translation component 110, e.g., reported by the reconfigurable storage device 102 to the configuration translation component 110. In another embodiment, the device profile 122 may be stored on the host 100, or in a remote location that is accessible by the host 100 and/or the reconfigurable storage device 102. Although the performance models 132 are shown stored as part of the device profile 122, in an alternative embodiment, the performance models 132 may be stored separately from the device profile 122.

If a vendor of reconfigurable storage device 102 can expose the device profile 122 to the host 100, the configuration translation component 110 in the host 100 can leverage the performance ranges 131, the performance models 132 and the runtime performance data 134. Otherwise, the configuration translation component 110 may need access to its own device profile 122 for each type of reconfigurable storage device 102.

In one embodiment, the runtime performance data 134 the device profile 122 may comprise typical performance indices available via a standard interface such as SMART (Self-Monitoring, Analysis and Reporting Technology) in the ATA specification, and vendor-specific runtime performance metrics such as min/max/avg read/write latency, min/max/avg queue length and waiting time, min/max/avg internal IOPS, read/write amplification ratio, garbage collection time, timeout count, and the like.

In one embodiment, other information stored as part of the runtime performance data 134 may include, but is not limited to, the following: device status, device background job status, and host background job status.

The device status may comprise status information about hardware and software of reconfigurable storage device 102. This may include not only the global information such as the degree of degradation of storage media (wear-level), the status of super capacitor, device temperature, over-provisioning ratio (or amount), and the like, but also the local information of logical device such as device size, device capacity, device utilization, SLA, feature set, feature settings, the degree of data fragmentation, timeout, protection, addressing mode, etc.

The device background job status may comprise status of device background jobs determined by device policies but not visible to the external of device such as background TRIM, background garbage collection, background compaction, and others.

The host background job status may comprise the status of device background jobs triggered by the host such as the offline test of the SMART self-test suite in the ATA specification.

The configuration translation component 110 in the host 100 shown in FIG. 1 may convert the high-level user QoS requirements in an SLA into device-specific configuration commands to change the configuration of the reconfigurable storage device 102. The configuration translation component 110 may understand the relation between the user requirements 123 and operations/policies of the reconfigurable storage device 102, which are device-specific. For instance, a storage device may need a queue with a large queue depth to meet a specific IOPS requirement. Similarly, low-end devices may need a queue with large queue depth and read priority to achieve a short read latency while high-end devices can achieve the similar latency without read priority.

Figure 3:
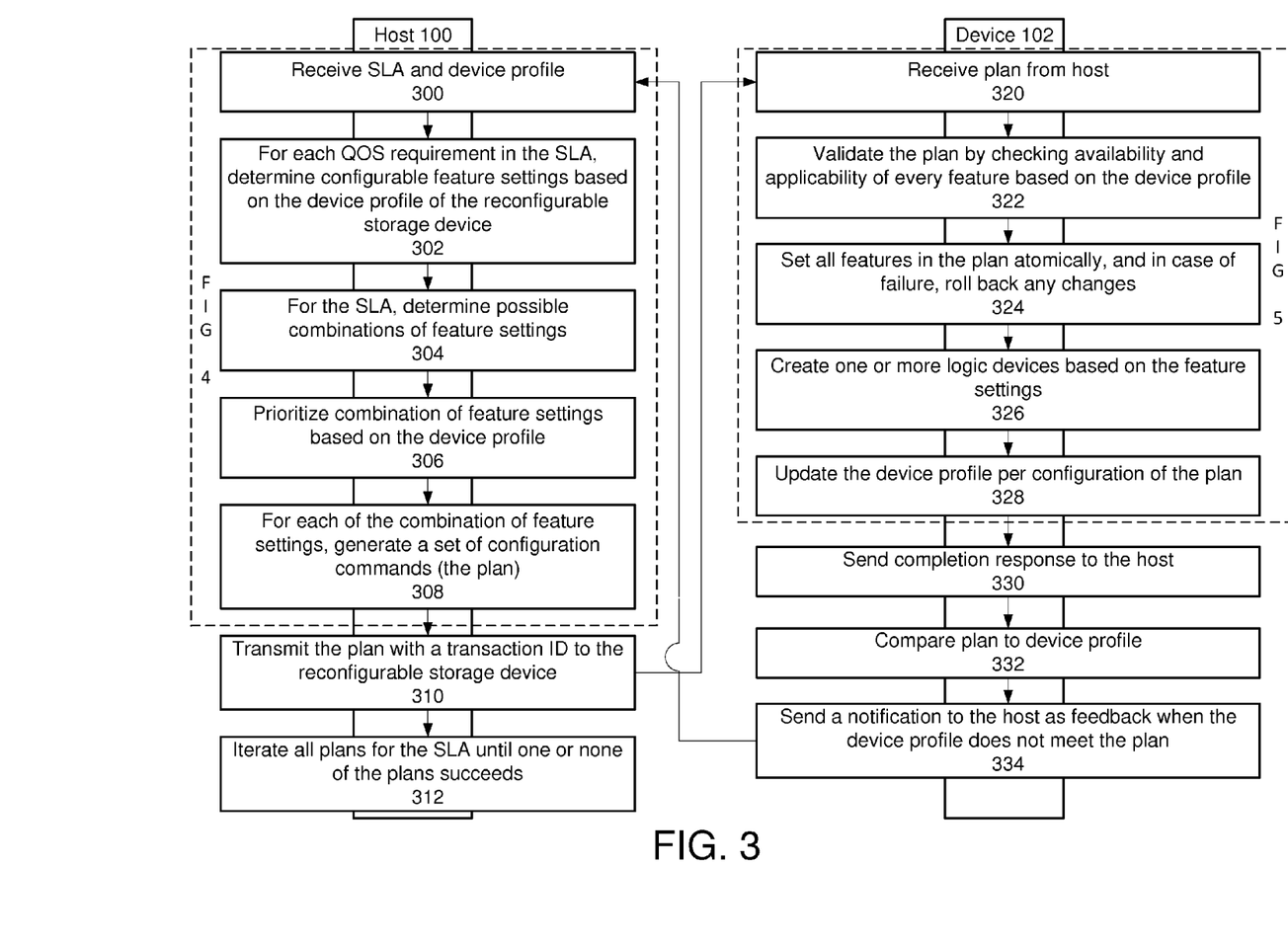
FIG. 3 is a flow diagram illustrating in further detail, the process for configuring the reconfigurable storage device.

FIG. 3 is a flow diagram illustrating in further detail, the process for configuring the reconfigurable storage device 102. In one embodiment, the process steps performed on the host 100 are performed by the configuration translation component 110 and the process steps performed on the reconfigurable storage device 102 are performed by the configuration component 118.

The process may begin on the host 100 by receiving an SLA as well as receiving the device profile 122 (block 300). For each QoS requirement of the SLA, configurable feature settings are determined based on the device profile 122 of the reconfigurable storage device 102 (block 302), and possible combinations of feature settings are determined (block 304) (QoS) for SLA. The combination of feature settings are prioritized based on the device profile 122 for the reconfigurable storage device 102 (block 306). For each of the combination of feature settings, a set of configuration commands referred to as a plan are generated (block 308). The plan or individual configuration commands of the plan are transmitted with a transaction ID to the reconfigurable storage device 102 (block 310). A plan can be rejected by the configuration component in the device because the device state can change in case of races while plans are being generated. Therefore, the host 100 may iterate plans until one or none of the plans succeeds (block 312).

The process may begin on the storage device 102 by receiving the plan from the host (block 320). The plan is validated by checking the availability and applicability of every feature based on the device profile 122 (block 322). All features in the plan are set atomically, and in case of failure, any changes are rolled back (block 324). One or more logic devices are created based on the feature settings (block 326). The device profile 122 is updated per configuration of the plan (block 328). A completion response is then sent to the host 100 (block 330).

Figure 6:
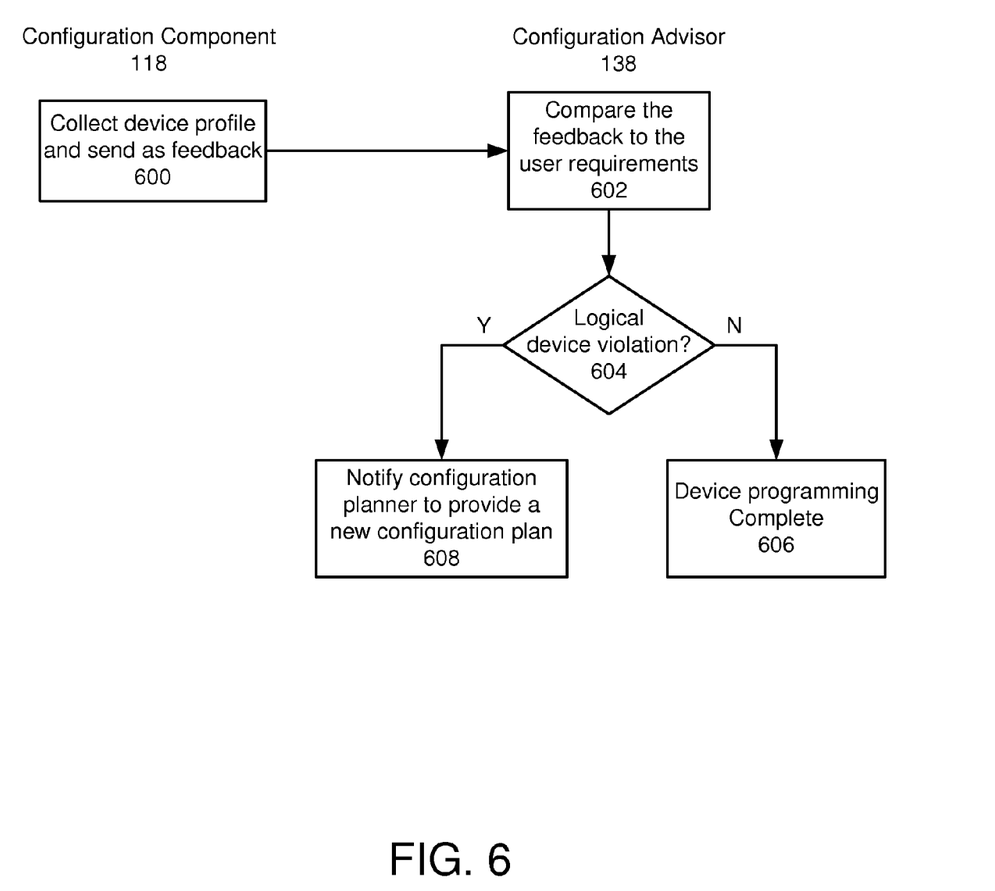
FIG. 6 is a flow diagram illustrating execution flow of the configuration advisor according to one embodiment.

During operation of the storage device 102, the plan is compared to the device profile, particularly the real-time performance statistics 134 (block 332). A notification is then sent to the host as feedback 130 when the device profile does not meet the plan (block 334). The configuration advisor 138 then uses the feedback to guide the configuration planner for proper adjustment (FIG. 6).

The following describes in further detail the function of the three components comprising the configuration translation component 110 as shown in FIG. 1—the configuration planner 136, the configuration advisor 138, and the device programmer 136, as well as the configuration component 118 in the reconfigurable storage device 102.

The configuration planner 136 receives the user requirements 123 (e.g., the SLA) and analyzes possible configuration plans comprising configuration commands 128 based on the policies that the device supports as specified in the device profile 122 (e.g., the runtime performance data 134) and generates a configuration plan as a recommendation. More particularly, the configuration planner 136 comprises a conversion algorithm to convert SLA specifications to feature settings based on the device profile 122, determines optimal combinations out of the converted feature settings, and generates a plan comprising configuration commands 128 from the optimal combinations.

As an example, assume that the storage device has a device profile as follows: the latency increases by x % and IOPS decreases by y % with an encryption feature, while prioritizing read over write improves the read latency about z % and the increase of queue depth improves IOPS by w % ratio. If the user wants to achieve the same performance even with an option of encryption, the configuration planner 136 may need to enable read priority and/or increase the queue depth to offset the latency increase due to encryption.

The configuration planner 136 can generate multiple configuration plans from the user requirements, and the configuration planner 136 selects the best plan, considering the performance and status of the storage device 102 and the user requirements. The configuration planner 136 may have multiple performance models 132 associated with each feature of the reconfigurable storage device, correlation and anti-correlation between features, and others and multiple planning algorithms that evaluate the performance models 132 and generate the configuration plans. The configuration planner 136 may share the performance profiles 132 with the storage device 102 if the storage device 102 provides access to the performance profiles 132. Otherwise, the host 100 may have its own performance profiles.

Once the configuration component 118 in the storage device 102 receives the plan, the configuration component 118 can reject the plan if the plan exceeds the capability that the device can support. For example, if the device does not provide performance profiles or if the device experiences any delays or races when capturing the current performance characteristics, the performance profile that the device provides can be stale. In this case, the device cannot honor the plan even though the decision is based on its performance profile 122. However, in one embodiment, the configuration component 118 can enforce the plan with its own risk as well.

The configuration plan may comprise a set of configuration commands each of which is a predefined vendor-unique command or a standard command that the storage device 102 can understand. For the previous example, the configuration planner 136 needs to send two commands: one for scheduling policy, giving priority of read over write, and another one for queue property, increasing the queue size. Optionally, the configuration planner 136 can send a command for the whole plan with a transaction ID. Depending on the settings and status of the storage device 102, the configuration component 118 may honor the configuration commands or the plan or not.

Figure 4:
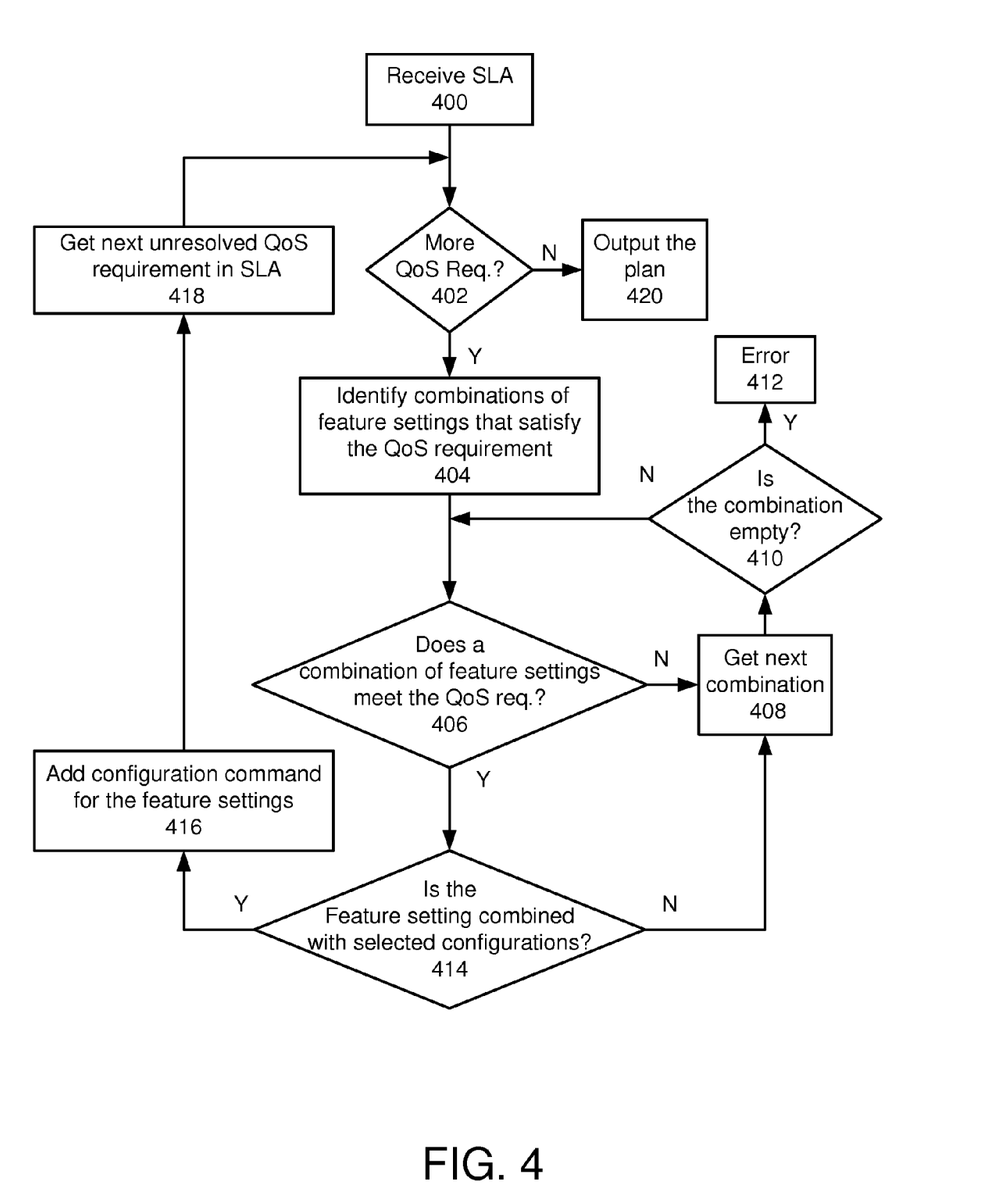
FIG. 4 is a flow diagram illustrating an example conversion process performed by the configuration planner to generate a plan.

FIG. 4 is a flow diagram illustrating an example conversion process performed by the configuration planner 136 to generate a plan. The process corresponds to blocks 300-308 of FIG. 3. Once the SLA is received (block 400), it is determined whether there are more QoS requirements to resolve (block 402). If so, possible combinations of feature settings that can satisfy a current QoS requirement are identified (block 404). The decision in this step is a more or less general guideline based on the static information (or predefined knowledge), which can vary depending on devices but can reduce the search space of the next steps. It is then determined if a combination of feature settings meets the current QoS requirement with a specific device of interest, based on the performance profile (block 406). If not, the next combination of feature settings is obtained (block 408). It is then determined if the combination is empty to confirm that all possible combinations are tried in case of failures (block 410), and if so, an error is generated (block 412). If the combination is not empty, the process continues at block 406.

If the combination of feature settings meets the current QoS requirement (block 406), then it is determined if the combination of feature settings is combined with the already selected configurations for all SLAs and QoSs of this device (block 414). Again, due to the dynamic change of device performance in case of races, the combination may not work. If so, a configuration command for the feature settings is added to the plan (block 416), and the next unresolved QoS in the SLA is obtained (block 418). When it is determined that there are no more QoS requirements the process (block 402), the configuration planner 136 outputs the plan to the configuration component 118 in the reconfigurable storage device 102 (block 420).

Referring again to FIG. 1, the device programmer 140 receives the plan selected by the configuration planner 136 and sends the plan to the reconfigurable storage device 102 over a configuration command channel(s) for execution of the plan and configuration of the storage device accordingly. The device programmer 140 may receive a response from the reconfigurable storage device regarding execution of plan.

Since the configuration planner 136 recommends multiple plans (which are likely ordered by the plan quality), the device programmer 140 may need to iterate the plans in case of a negative response from the reconfigurable storage device 102 until a plan is found that that actually works with the reconfigurable storage device 102. If the device programmer 140 experiences any errors during the plan programming (e.g., due to the rejection from the configuration component 118), the device programmer 140 should be able to roll back the changes made by the plan if needed.

The configuration command channel(s) used to execute the configuration commands and the feedback channel(s) used to monitor and collect the performance profile and status information of device can be a standard host interface such as SATA, SAS, PCIe, and NVMe, or a special interface devised for this purpose.

Figure 5:
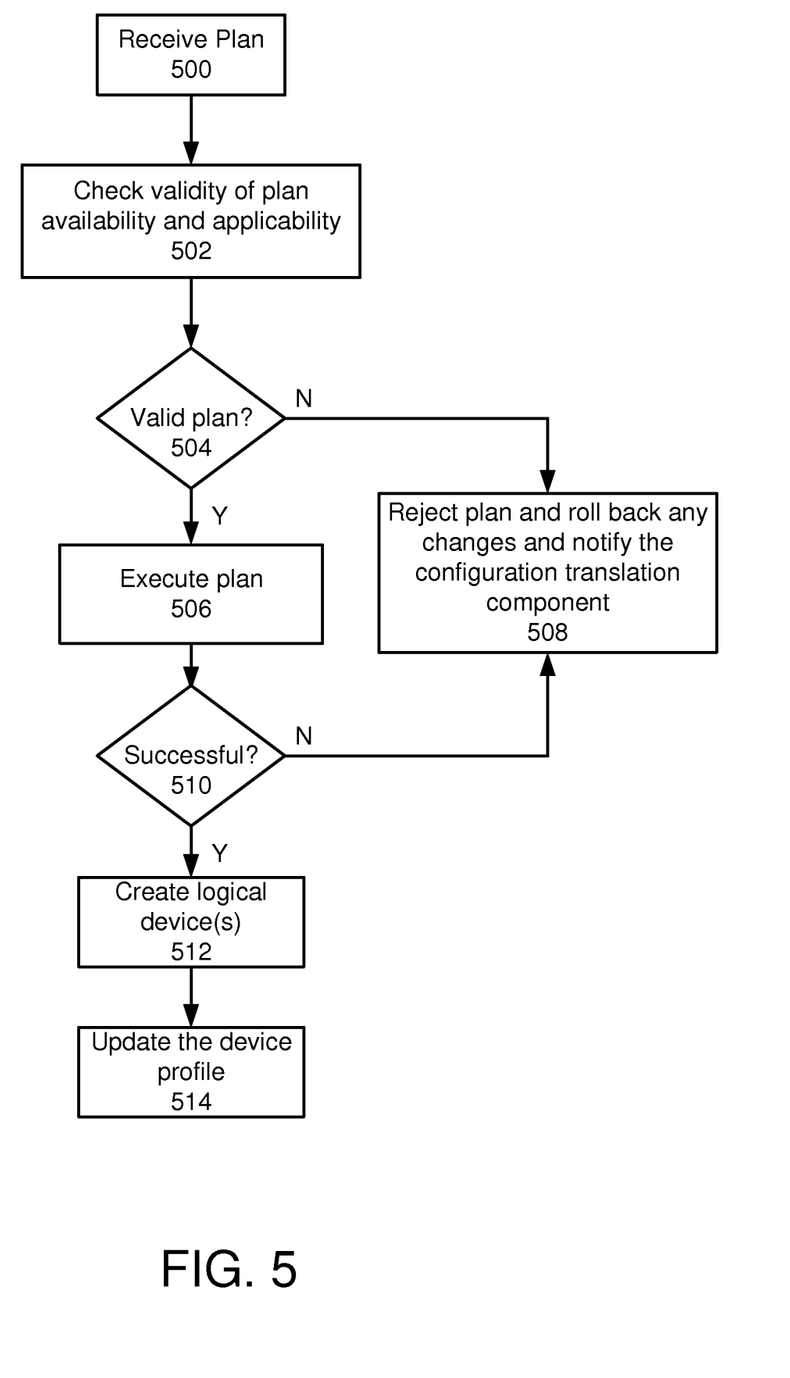
FIG. 5 is a flow diagram illustrating processing of the configuration component on the reconfigurable storage device.

FIG. 5 is a flow diagram illustrating processing of the configuration component 118 on the reconfigurable storage device 102. This process corresponds to block 202 of FIG. 2A where the reconfigurable storage device is reconfigured using the feature settings from the host 100, as well as to blocks 320-328 of FIG. 3.

The process may begin when the configuration component 118 receives a plan from the device programmer 140 on the host 100 comprising at least one configuration command 128 containing feature settings (block 500).

The configuration component 118 may first check availability and applicability of the feature settings in the plan based on the device profile (block 502). Checking availability may include determining if the storage device supports the feature settings by comparing the plan to the device profile 122. Checking applicability may include estimating a degree of adjustment to features based on the device profile 122, and by controlling adjustment of the features within an applicable boundary feature based on the device profile 122.

The plan is validated when both availability and applicability of the feature settings are true (block 504). The configuration component 118 executes the plan (block 506), in one embodiment, execute the plan comprises executing individual configuration commands atomically.

When the plan is not valid (block 504), the configuration component 118 rejects the plan and rolls back any changes that were made with respect to the plan, and sends a notification (e.g., an error signal) to the configuration translation component 110 (block 508). For instance, if the current clock frequency is already set to a maximum clock rate, any plan attempting to increase the clock speed will be rejected. The rollbacks could be a source of inaccuracy in the performance profile of reconfigurable storage device in case of races.

If execution of the plan is successful (block 510), one or more logical devices are created on the reconfigurable storage device by associating the plan (i.e., executed configuration commands) with a storage space (block 512). Finally, the configuration component 118 updates the device profile 122 (block 514).

According the exemplary embodiment, a physical storage device can host multiple logical devices 121, and each logical device 121 can be configured independently and have its own characteristics. Thus, the reconfigurable storage system of the exemplary embodiment creates QoS-aware logical devices 121. The logical devices 121 may rely on different technologies such as space partition (like traditional OS partition), multi-queue (like the NVMe standard), multi-tenancy (like Cloud PaaS), virtualization (like the SR-IOV standard), and others, which are device-specific.

For instance, assume that the user needs two 100 GB storage spaces in a single device: one for read-intensive workloads and the other for write-intensive workloads. With a simple reconfigurable storage device based on the space partition technique with multi-queues, the user can create two partitions (e.g., /dev/sda[1,2]) on the device and then configure one partition (e.g., /dev/sda1) associated with one queue as a logical device for reads and the other partition (e.g., /dev/sda2) associated with the other queue as a logical device for writes. Then, the device can deliver the sustained read performance through the logical device for reads without performance degradation due to writes. A typical storage device may reveal the long latency with this scenario because of the garbage collection due to writes.

Referring again to FIG. 1, the configuration advisor 138 may receive the device profile 122 as the feedback 130 via a feedback channel(s) (not shown). To reduce the data transfer overhead, the actual information sent to the host can vary. The configuration advisor 138 monitors the one or more logical devices across one or more physical storages devices, and determines if all the user requirements 123 are satisfied. The configuration advisor 138 also notifies the configuration planner 136 to adjust the plan based on the device profile in case of a SLA violation.

FIG. 6 is a flow diagram illustrating execution flow of the configuration advisor 138 according to one embodiment. The configuration advisor 138 waits on the configuration component 118 to collect and send the device profile 122, including the runtime performance data 134 of the logical devices 121, as feedback 130 (block 600). In one embodiment, the host 100 may include one or more feedback channel(s) comprising a standard interface to transfer input/output traces captured in the reconfigurable storage device 102. In another embodiment, the feedback channel(s) may comprise a special interface to allow the configuration advisor 138 to monitor the performance of the reconfigurable storage device 102.

In response to receiving the device profile 122, the configuration advisor 138 monitors the performance of reconfigurable storage device 102 by comparing the feedback 130 to the user requirements 123 (block 602). If the configuration advisor 138 determines that the runtime performance data 134 of none of logical devices violates the user requirements 123 (block 604), then programming of the reconfigurable storage device 102 is complete (block 606). If any of logical devices 121 fails to satisfy the user requirements 123, the configuration advisor 138 notifies the configuration planner 136 (e.g., by providing the runtime performance data 134 corresponding to the logical device) to provide a new configuration plan for the logical device (block 608), thereby dynamically adjusting settings and characteristics of the storage device 102.

In one embodiment, when a violation is detected, the configuration advisor 138 may also request the device profile 122 from the reconfigurable storage device 102 to retrieve the most up-to-date and comprehensive performance data to generate a new plan since the notification can contain only the performance of logical devices of interest. In one embodiment, the reconfigurable storage device 102 can actively report the device profile 122 periodically or whenever status of the runtime performance data 134 changes. For example, given a user requirement that all read requests must be served within X ms, the configuration advisor 138 can instruct the storage device to log the service time of read operations or to set a red flag when the service time is over X ms. Rather than wait on the device profile 122 to be sent from the reconfigurable storage device 102, the host 100 can also request the device profile 122 from the reconfigurable storage device 102 periodically or on demand basis.

In one embodiment, the configuration advisor 138 can be activated by the following events: when new user requirements 123 are submitted; when existing user requirements 123 are changed; when the runtime performance data 134 is updated; whenever the runtime performance data 134 is required (due to timeout); and/or whenever the reconfigurable storage device 102 cannot satisfy the user requirements 123.

Figure 7:
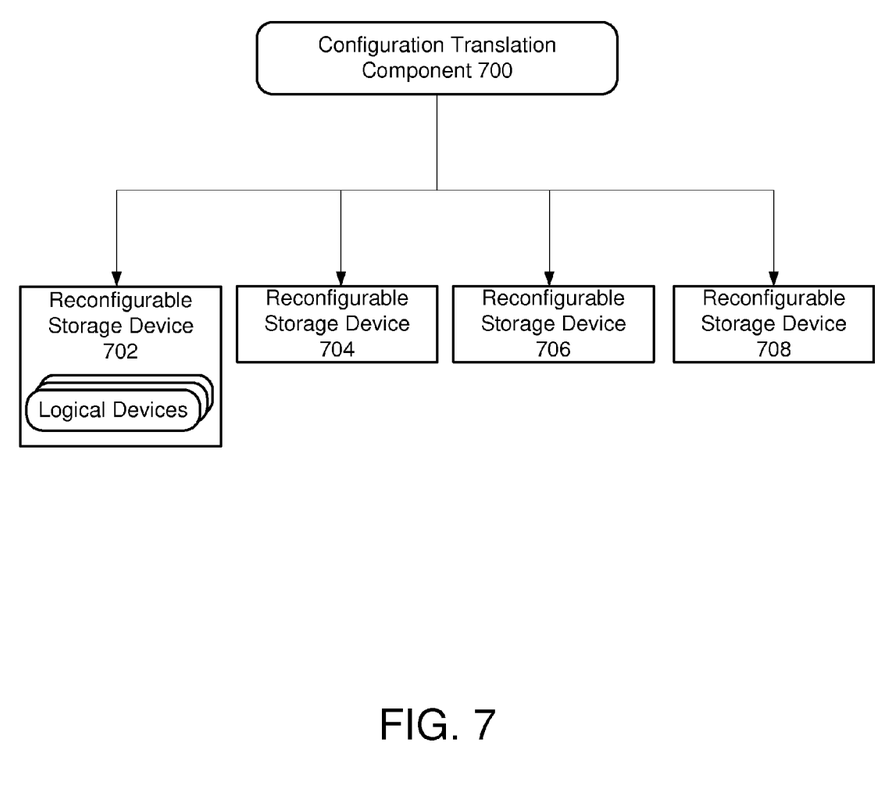
FIG. 7 is a block diagram illustrating a further embodiment for a reconfigurable storage system.

FIG. 7 is a block diagram illustrating a further embodiment for a reconfigurable storage system. This embodiment illustrates that a single configuration translation component 700 can manage not only multiple logical devices on one physical reconfigurable storage device 702, but may also manage multiple other physical reconfigurable storage devices 704, 706, and 708, each of which may include multiple logical devices.

A method and system for a reconfigurable storage system has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A method for reconfiguring a storage system, the method performed by at least one software component executing on at least one processor, comprising:
   receiving user requirement information for a storage device and automatically generating feature settings for the storage device from the user requirement information and a device profile for the storage device, the device profile including performance ranges of features particular to the storage device, performance models, and runtime performance data;
   using the feature settings to automatically reconfigure the storage device into one or more logical devices having independent behavioral characteristics;
   receiving feedback from the storage device regarding the runtime performance data of at least one of the storage device and the logical devices; and
   responsive to a determination that the runtime performance data do not satisfy the user requirement information, dynamically adjusting configuration of the one or more logical devices to meet the user requirement information.

2. The method of claim 1, wherein the user requirement information comprises a high-level description of behavioral characteristics of the storage device.

3. The method of claim 2, wherein the high-level description comprises at least one of a service level agreement (SLA) and quality of service (QoS) requirements.

4. The method of claim 3, wherein the SLA further comprises specifications for any combination of attributes including capacity, addressing mode, protection, and performance.

5. The method of claim 1, further comprising: using the device profile to determine whether a specification of the user requirement information can be satisfied by the storage device.

6. The method of claim 5, wherein the device profile comprises performance models that are associated with features of the storage device having a correlation with device performance.

7. The method of claim 5, further comprising: storing the device profile on the storage device and making the device profile available to a host.

8. The method of claim 5, further comprising: storing the device profile in at least one of: a host and a remote location accessible by the host or the storage device.

9. The method of claim 1, wherein automatically generating feature settings further comprises: using the feature settings to enable/disable particular features of the storage device and to specify values for particular features, wherein an effect of the features are global to all logical devices or local to a specific logical device.

10. The method of claim 1, wherein the runtime performance data comprises part of the device profile and includes performance indices available via a self-monitoring, analysis and reporting technology (SMART) interface, and vendor-specific runtime performance metrics including min/max/avg read/write latency, min/max/avg queue length, min/max/avg internal IOPS, read/write amplification ratio, and garbage collection time.

11. The method of claim 10, wherein the runtime performance data further comprises: device status, device background job status, and host background job status.

12. A reconfigurable storage system, comprising:
    a configuration translation component executing on a host that receives user requirement information for a storage device and automatically generates feature settings for the storage device from the user requirement information and a device profile for the storage device, the device profile including performance ranges of features particular to the storage device, performance models, and runtime performance data;
    a configuration component executing on the storage device that receives the feature settings from the host and uses the feature settings to automatically reconfigure the storage device into one or more logical devices having independent behavioral characteristics; and
    wherein the configuration translation component receives feedback from the storage device regarding the runtime performance data of at least one of the storage device and the logical devices, and responsive to a determination that the runtime performance data do not satisfy the user requirement information, dynamically adjusts configuration of the one or more logical devices to meet the user requirement information.

13. The system of claim 12, wherein the user requirement information comprises a high-level description of behavioral characteristics of the storage device.

14. The system of claim 13, wherein the high-level description comprises at least one of a service level agreement (SLA) and quality of service (QoS) requirements.

15. The system of claim 14, wherein the SLA further comprises specifications for any combination of attributes including capacity, addressing mode, protection, and performance.

16. The system of claim 12, wherein the configuration translation component is further configured to use the device profile to determine whether a specification of the user requirement information can be satisfied by the storage device.

17. The system of claim 16, wherein the device profile comprises performance models that are associated with features of the storage device having a correlation with device performance.

18. The system of claim 16, wherein the device profile is stored on the storage device and made available to the host.

19. The system of claim 16, wherein the device profile in at least one of: the host and a remote location accessible by the host or the storage device.

20. The system of claim 12, wherein the configuration translation component is further configured to use the feature settings to enable/disable particular features of the storage device and to specify values for particular features, wherein an effect of the features are global to all logical devices or local to a specific logical device.

21. The system of claim 12, wherein the runtime performance data comprises part of the device profile and includes performance indices available via a self-monitoring, analysis and reporting technology (SMART) interface, and vendor-specific runtime performance metrics including min/max/avg read/write latency, min/max/avg queue length and waiting time, min/max/avg internal IOPS, read/write amplification ratio, garbage collection time, and timeout count.

22. The system of claim 21, wherein the runtime performance data further comprises: device status, device background job status, and host background job status.

23. An executable software product stored on a computer-readable storage medium containing program instructions for reconfiguring a storage system, the program instructions for:

receiving user requirement information for a storage device and automatically generating feature settings for the storage device from the user requirement information and a device profile for the storage device, the device profile including performance ranges of features particular to the storage device, performance models, and runtime performance data;

using the feature settings to automatically reconfigure the storage device into one or more logical devices having independent behavioral characteristics;

receiving feedback from the storage device regarding the runtime performance data of at least one of the storage device and the logical devices; and responsive to a determination that the runtime performance data do not satisfy the user requirement information, dynamically adjusting configuration of the one or more logical devices to meet the user requirement information.

24. The executable software product of claim 23, wherein the user requirement information comprises a high-level description of behavioral characteristics of the storage device.

25. The executable software product of claim 24, wherein the high-level description comprises at least one of a service level agreement (SLA) and quality of service (QoS) requirements.

26. The executable software product of claim 25, wherein the SLA further comprises specifications for any combination of attributes including capacity, addressing mode, protection, and performance.

27. The executable software product of claim 23, further comprising program instructions for: using the device profile to determine whether a specification of the user requirement information can be satisfied by the storage device.

28. The executable software product of claim 27, wherein the device profile comprises performance models that are associated with features of the storage device having a correlation with device performance.

29. The executable software product of claim 27, further comprising program instructions for: storing the device profile on the storage device and making the device profile available to a host.

30. The executable software product of claim 27, further comprising program instructions for: storing the device profile in at least one of: a host and a remote location accessible by the host or the storage device.

31. The executable software product of claim 23, wherein automatically generating feature settings further comprises program instructions for: using the feature settings to enable/disable particular features of the storage device and to specify values for particular features, wherein an effect of the features are global to all logical devices or local to a specific logical device.

32. The executable software product of claim 23, wherein the runtime performance data comprises part of the device profile and includes performance indices available via a self-monitoring, analysis and reporting technology (SMART) interface, and vendor-specific runtime performance metrics including min/max/avg read/write latency, min/max/avg queue length and waiting time, min/max/avg internal IOPS, read/write amplification ratio, garbage collection time, and timeout count.

33. The executable software product of claim 32, wherein the runtime performance data further comprises: device status, device background job status, and host background job status.

34. A host that reconfigures a storage device, comprising:
a memory;
a processor coupled to the memory; and
a first software component executed by the processor that is configured to:
receive user requirements including a service level agreement (SLA) specifications;
convert the SLA specifications to feature settings based on a device profile, the device profile including performance ranges of features particular to the storage device, performance models, and runtime performance data;
determine optimal combinations of the feature settings;
generate multiple plans comprising configuration commands from the optimal combinations; and
select one of the plans considering performance and status of the storage device and the user requirements; and
a second software component executed by the processor that is configured to:
receive the selected plan;
send the plan to the reconfigurable storage over a configuration channel;
receive a response from the storage device; and
iterate the plans in case of a negative response from the storage device; and
a third software component executed by the processor that is configured to:
collect the device profile and send the device profile to the first software component;
monitor the one or more logical devices created on the storage device, and determine if all the user requirements are satisfied; and
notify the first software component to adjust the plan based on the device profile in case of a SLA violation.

35. The host of claim 34, further comprising: multiple performance models associated with each feature of the reconfigurable storage device, correlation and anti-correlation between features, and planning algorithms that evaluate the performance models and generate the configuration plans.

36. A reconfigurable storage device, comprising:
a main storage;
a processor coupled to the main storage; and
a software component executed by the processor that is configured to:
receive a plan comprising at least one configuration command containing feature settings;
check availability and applicability of the feature settings in the plan based on a device profile, the device profile including performance ranges of features particular to the storage device, performance models, and runtime performance data;
when the plan is not valid, rejecting the plan and rolling back any changes that were made by the plan;
validating the plan when both availability and applicability of the feature settings are true;
executing the plan, and updating the device profile; and
creating one or more logical devices on the reconfigurable storage device by associating the executed plan with a storage space.

37. The reconfigurable storage device of claim 36, wherein the software component checks the availability of the feature settings by: determining if the reconfigurable storage device supports the feature settings by comparing the plan to the device profile.

38. The reconfigurable storage device of claim 37, wherein the software component checks the applicability of the feature settings by: estimating a degree of adjustment to features based on the device profile, and by controlling adjustment of the features within an applicable boundary feature based on the device profile.

* * * * *